(12) United States Patent
Lee

(10) Patent No.: US 11,355,101 B2
(45) Date of Patent: Jun. 7, 2022

(54) ARTIFICIAL INTELLIGENCE APPARATUS FOR TRAINING ACOUSTIC MODEL

(71) Applicant: LG ELECTRONICS INC., Seoul (KR)

(72) Inventor: Jeehye Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 129 days.

(21) Appl. No.: 16/814,869

(22) Filed: Mar. 10, 2020

(65) Prior Publication Data

US 2021/0193119 A1    Jun. 24, 2021

(30) Foreign Application Priority Data

Dec. 20, 2019    (KR) .................... 10-2019-0171684

(51) Int. Cl.
| | |
|---|---|
| *G10L 15/00* | (2013.01) |
| *G10L 15/06* | (2013.01) |
| *G06N 3/08* | (2006.01) |
| *G06N 3/04* | (2006.01) |
| *G10L 15/02* | (2006.01) |
| *G10L 15/22* | (2006.01) |
| *G10L 15/30* | (2013.01) |

(52) U.S. Cl.
CPC .............. *G10L 15/063* (2013.01); *G06N 3/04* (2013.01); *G06N 3/08* (2013.01); *G10L 15/005* (2013.01); *G10L 15/02* (2013.01); *G10L 15/22* (2013.01); *G10L 15/30* (2013.01); *G10L 2015/025* (2013.01)

(58) Field of Classification Search
None
See application file for complete search history.

(56) References Cited

U.S. PATENT DOCUMENTS

| | | | | |
|---|---|---|---|---|
| 7,415,411 | B2 * | 8/2008 | Reinhard | G10L 15/063 704/257 |
| 9,697,821 | B2 * | 7/2017 | Rao | G10L 15/063 |
| 9,959,862 | B2 * | 5/2018 | Kang | G10L 15/063 |
| 2017/0287474 | A1 * | 10/2017 | Maergner | G06F 40/211 |
| 2019/0057685 | A1 * | 2/2019 | Yu | G10L 19/00 |

\* cited by examiner

*Primary Examiner* — Satwant K Singh
(74) *Attorney, Agent, or Firm* — Lee Hong Degerman Kang & Waimey

(57) ABSTRACT

Disclosed is an artificial intelligence (AI) apparatus for training an acoustic model, and more particularly, an AI apparatus for training an acoustic model including a shared network and a branch network connected to the shared network using speech data and phonemes corresponding to the speech data.

14 Claims, 8 Drawing Sheets

ARTIFICIAL INTELLIGENCE APPARATUS FOR TRAINING ACOUSTIC MODEL

CROSS-REFERENCE TO RELATED APPLICATIONS

Pursuant to 35 U.S.C. § 119(a), this application claims the benefit of earlier filing date and right of priority to Korean Patent Application No. 10-2019-0171684, filed on Dec. 20, 2019, the contents of which are all hereby incorporated by reference herein in their entirety.

FIELD

The present disclosure relates to an artificial intelligence (AI) apparatus for obtaining speech data corresponding to user speech and training an acoustic model including a shared network and a branch network using phonemes corresponding to the obtained speech data.

BACKGROUND

Speech recognition is a technology for receiving user speech and automatically converting the user speech into a text. Recently, speech recognition has been used as an interface technology for replacing keyboard input on a smartphone, a television, or the like has been used.

In general, a speech recognition system performs speech recognition using an acoustic model, a grammar model, or a pronouncing dictionary. The speech recognition system needs to pre-establish a grammar model, a pronouncing dictionary, and the like for a predetermined word in order to recognize speech of the predetermined word from a speech signal.

User speech is different for each person. In detail, the accuracy of pronunciation may be different for each mouth shape, and each tongue position. This features are identified by an acoustic model, and in the case of a globally common language such as English, various variations of speech data are calculated and there is a problem in that the variations adversely affects the consistency of acoustic signals to degrade the accuracy of speech recognition.

SUMMARY

An object of the present disclosure is to enhance the accuracy of speech recognition without a procedure of unifying different phonemes of native and foreign speakers to one using a shared network and a branch network connected to the shared network.

The present disclosure provides an artificial intelligence (AI) apparatus for training an acoustic model including a shared network and a branch network connected to the shared network using phonemes corresponding to speech data.

In addition, the present disclosure provides an AI apparatus for training an acoustic model to output hidden representation by applying common acoustic information of speech data obtained by the shared network and outputting phonemes corresponding to the received speech data using hidden representation output from the shared network by the branch network.

DETAILED DESCRIPTION

Figure 1:
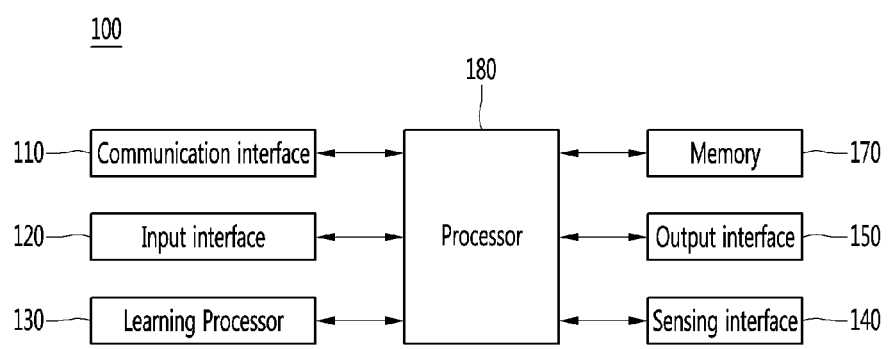
FIG. 1 is a block diagram illustrating an AI apparatus according to an embodiment of the present disclosure.

Hereinafter, details of the present disclosure will be described.

An embodiment described below is only an example of the present disclosure, and the present disclosure can be deformed in various modes. Hence, specific configurations and functions disclosed below by no means limit the claims.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "interface" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Artificial Intelligence (AI)

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

Robot

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving interface may include an actuator or a motor and may perform various physical operations such as moving a robot joint. In addition, a movable robot may include a wheel, a brake, a propeller, and the like in a driving interface, and may travel on the ground through the driving interface or fly in the air.

Self-Driving

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

eXtended Reality (XR)

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present disclosure.

Hereinafter, the AI apparatus 100 may be referred to as a terminal.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication interface 110, an input interface 120, a learning processor 130, a sensing interface 140, an output interface 150, a memory 170, and a processor 180.

The communication interface 110 may transmit and receive data to and from external devices such as other 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

Here, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a training data for model learning and an input data to be used when an output is acquired by using learning model. The input interface 120 may acquire raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing interface 140 may acquire at least one of internal information about the AI apparatus 100, ambient environment information about the AI apparatus 100, and user information by using various sensors.

Examples of the sensors included in the sensing interface 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

Here, the output interface 150 may include a display interface for outputting time information, a speaker for outputting auditory information, and a haptic module for outputting haptic information.

The memory 170 may store data that supports various functions of the AI apparatus 100. For example, the memory 170 may store input data acquired by the input interface 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
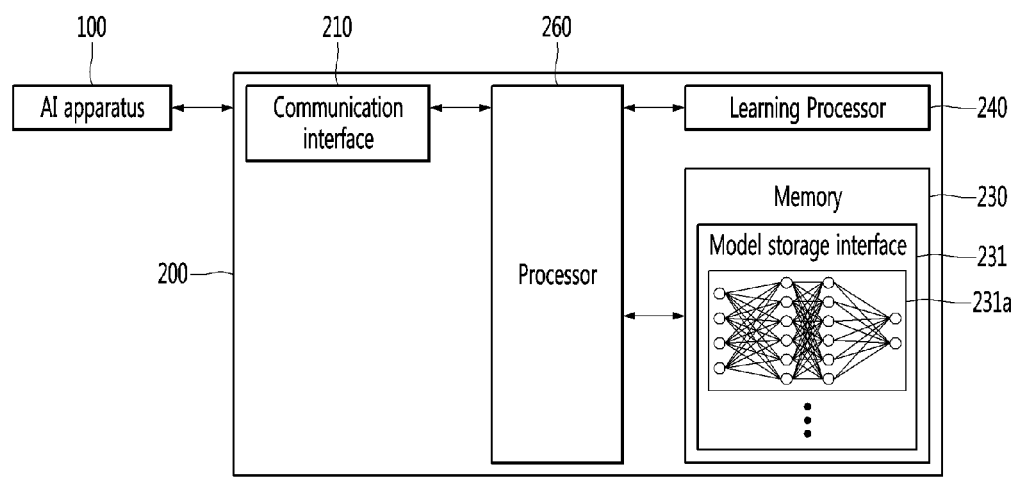
FIG. 2 is a block diagram illustrating an AI server according to an embodiment of the present disclosure.

FIG. 2 is a block diagram illustrating an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication interface 210, a memory 230, a learning processor 240, a processor 260, and the like.

The communication interface 210 can transmit and receive data to and from an external device such as the AI apparatus 100.

The memory 230 may include a model storage interface 231. The model storage interface 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
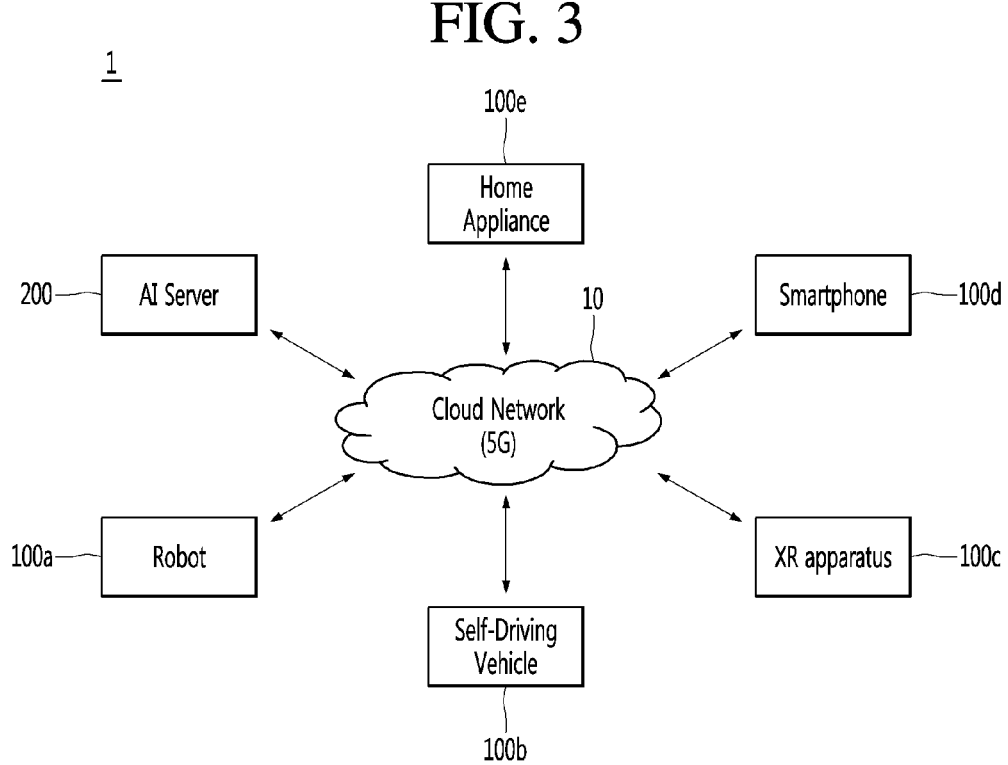
FIG. 3 is a view illustrating an AI system according to an embodiment of the present disclosure.

FIG. 3 is a view illustrating an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

Here, the AI server 200 may learn the artificial neural network according to the machine learning algorithm instead of the AI apparatuses 100a to 100e, and may directly store the learning model or transmit the learning model to the AI apparatuses 100a to 100e.

Here, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

AI+Robot

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

Here, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external device to determine the travel route and the travel plan, and may control the driving interface such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving interface based on the control/interaction of the user. Here, the robot 100a may acquire the intention information of the interaction due to the user's operation or speech utterance, and may determine the response based on the acquired intention information, and may perform the operation.

AI+Self-Driving

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling route by using the recognized surrounding information or object information. The learning model may be learned directly from the self-driving vehicle 100a or may be learned from an external device such as the AI server 200.

Here, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external device to determine the travel route and the travel plan, and may control the driving interface such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving interface based on the control/interaction of the user. Here, the self-driving vehicle 100b may acquire the intention information of the interaction due to the user's operation or speech utterance, and may determine the response based on the acquired intention information, and may perform the operation.

AI+XR

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

Here, the XR device 100c may perform the operation by generating the result by directly using the learning model, but the sensor information may be transmitted to the external device such as the AI server 200 and the generated result may be received to perform the operation.

AI+Robot+Self-Driving

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given route without the user's control or moves for itself by determining the route by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

Here, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving interface of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

AI+Robot+XR

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

AI+Self-Driving+XR

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
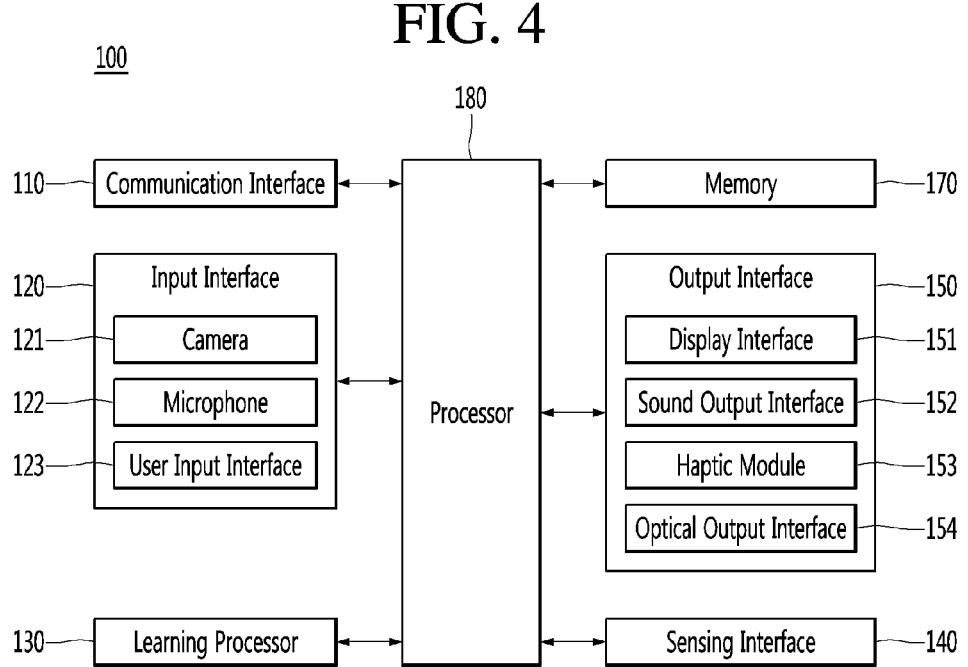
FIG. 4 is a block diagram illustrating an AI apparatus according to an embodiment of the present disclosure.

FIG. 4 is a block diagram illustrating an AI apparatus 100 according to an embodiment of the present disclosure.

The redundant repeat of FIG. 1 will be omitted below.

In the present disclosure, the AI apparatus 100 may include an edge device.

The communication interface 110 may also be referred to as a communicator.

Referring to FIG. 4, the input interface 120 may include a camera 121 for image signal input, a microphone 122 for receiving audio signal input, and a user input interface 123 for receiving information from a user.

Voice data or image data collected by the input interface 120 are analyzed and processed as a user's control command.

Then, the input interface 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display interface 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input interface 123 is to receive information from a user and when information is inputted through the user input interface 123, the processor 180 may control an operation of the AI apparatus 100 to correspond to the inputted information.

The user input interface 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The sensing interface 140 may also be referred to as a sensor interface.

The output interface 150 may include at least one of a display interface 151, a sound output module 152, a haptic module 153, or an optical output module 154.

The display interface 151 may display (output) information processed in the AI apparatus 100. For example, the display interface 151 may display execution screen information of an application program running on the AI apparatus 100 or user interface (UI) and graphic user interface (GUI) information according to such execution screen information.

The display interface 151 may be formed with a mutual layer structure with a touch sensor or formed integrally, so that a touch screen may be implemented. Such a touch screen may serve as the user input interface 123 providing an input interface between the AI apparatus 100 and a user, and an output interface between the AI apparatus 100 and a user at the same time.

The sound output module 152 may output audio data received from the wireless communication interface 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

Figure 5:
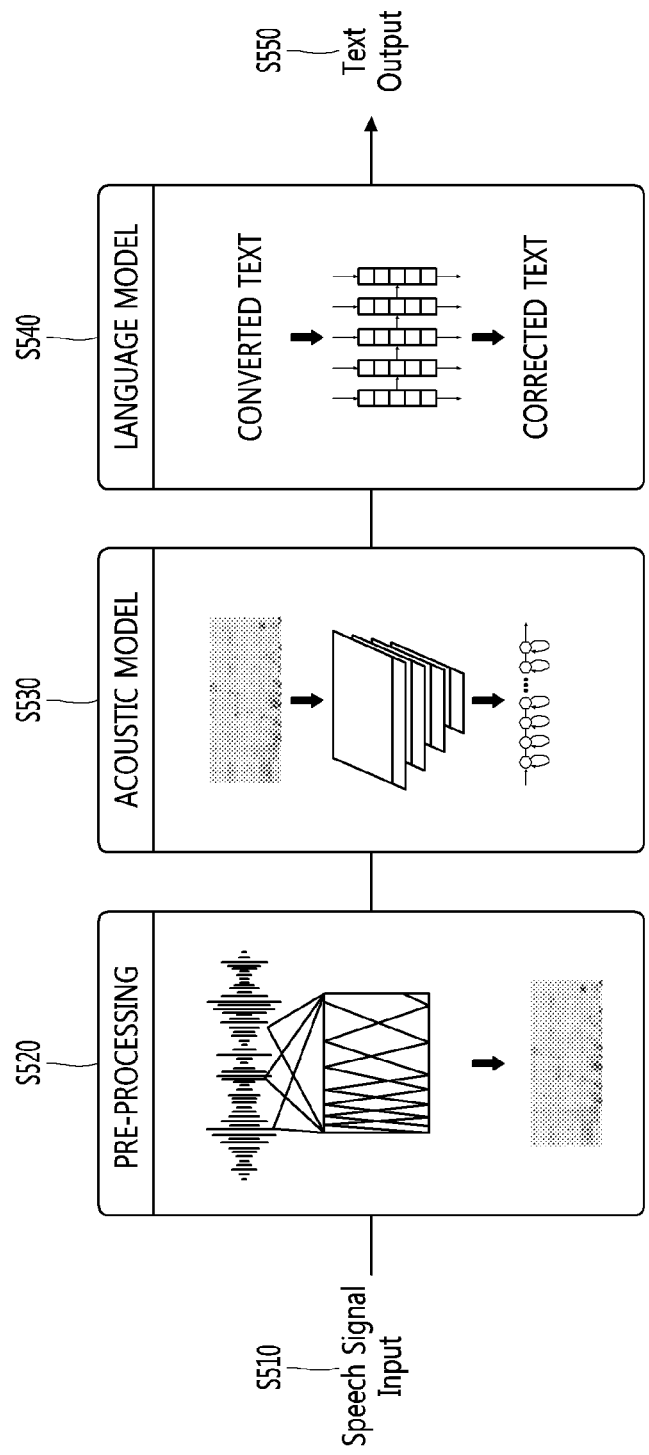
FIG. 5 illustrates a general speech recognition procedure.

FIG. 5 illustrates a general speech recognition procedure.

In a general speech recognition model, when speech data is obtained, text data may be derived through a pre-processing procedure, an acoustic model, and a language model. In detail, the speech recognition model may include a feature vector extraction model, an acoustic model, a pronouncing model, and a language model.

In detail, when speech data is input to the speech recognition model (S510), a feature vector may be extracted from the input speech data through a feature vector extraction module (S520). In this case, a procedure of extracting the feature vector may be interchangeably used with the pre-processing procedure. In general, the speech recognition model may use $12^{th}$ mel-cepstrum (MFCC), log energy, and primary and secondary differential coefficients therefor as an algorithm for extracting a feature vector.

Similarity measurement and recognition procedures may be performed on the feature data obtained from feature extraction. For the similarity measurement and recognition, an acoustic model for modeling and comparing signals features of speech, and a language model for modeling a linguistic order relation of a word, a syllable, or the like corresponding to a recognized vocabulary may be used (S530 and S540). In addition, when a procedure of correcting a converted text into a corrected text is performed on the language model, a final speech recognition result may be derived (S550).

Figure 6:
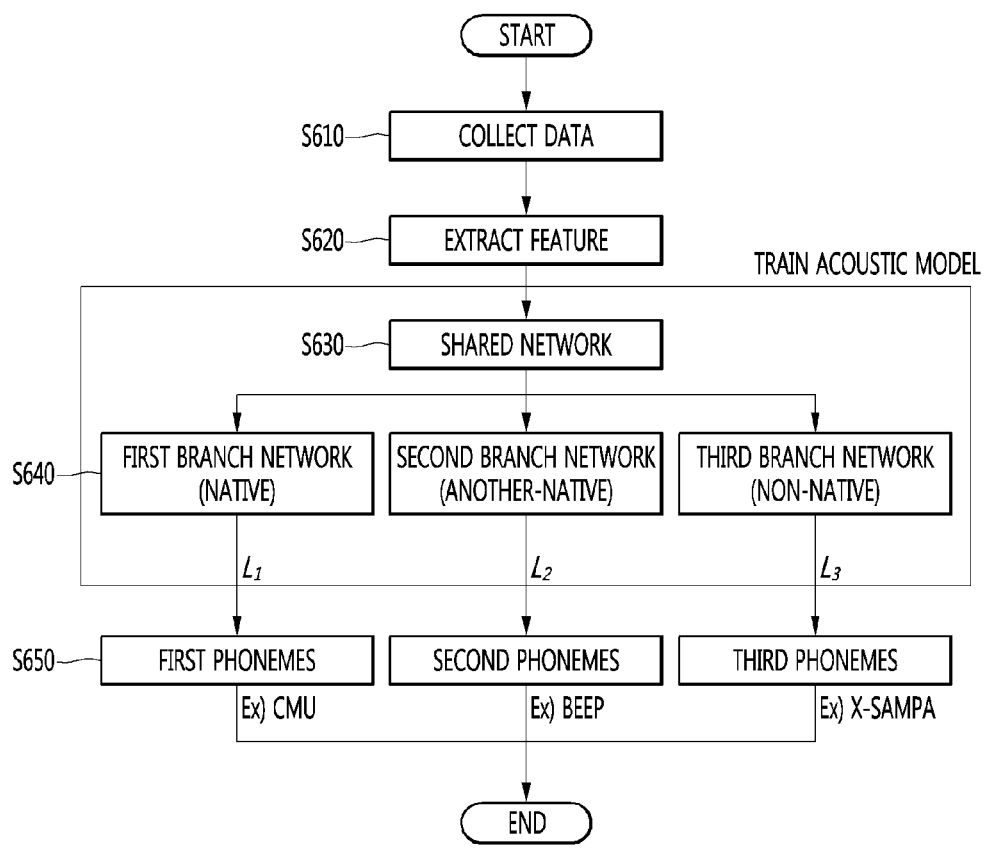
FIG. 6 is a flowchart according to the present disclosure.

FIG. 6 is a flowchart according to the present disclosure.

Prior to a description of the flowchart according to the present disclosure, when a feature vector corresponding to the input speech data is extracted in a general speech recognition procedure, a feature vector may be processed through the acoustic model, the pronouncing model, and the language model in a pattern matching procedure for speech recognition. Thus, as a method for enhancing the performance of the speech recognition model, the feature vector may be classified from a point of view of an acoustic model, a language model, and a pronouncing model.

An object of the present disclosure is to enhance the performance of an acoustic model in consideration of a point of view of the acoustic mode and the present disclosure proposes an AI apparatus for enhancing the performance of speech recognition for speech uttered by a foreign speaker while maintaining the performance of speech recognition for speech uttered by a native speaker.

Hereinafter, FIG. 6 will be described.

Referring to FIG. 6, the input interface 120 of the AI apparatus 100 may obtain speech data (S610). In this case, the input interface 120 may include a microphone and may be embodied as at least one of sensor. The speech data may include speech data corresponding to a speech signal uttered by a user.

When obtaining the speech data, the processor 180 of the AI apparatus 100 may extract the feature of the speech data (S620). In detail, feature extraction may include a pre-processing procedure for removing noise of the speech data. The noise may be removed using a filter used in signal processing.

The processor 180 may extract the feature of actually valid sound from noise of the obtained speech data and background sound. In detail, Linear Prediction Coefficients (LPC) and Linear Prediction Cepstral Coefficient (LPCC) using MFCC or HMM Classifier may be used.

The extracting of the feature of the speech data (S620) may include a procedure for language embedding corresponding to the feature vector as a method of digitizing the input speech data.

The processor 180 of the AI apparatus 100 according to the present disclosure may train the acoustic model using the speech data and phonemes corresponding to the speech data (S630 to S650).

In this case, the acoustic model may be used to represent a speech signal, a phoneme, or a relationship between different language units included in speech. In addition, the acoustic model may model a relationship between the speech signal and a phoneme of a language.

In detail, the acoustic model according to the present disclosure may include a shared network and a branch network. The acoustic model according to the present disclosure may include a shared network and a branch network connected to the shared network. The processor 180 may input the speech data to the acoustic model and may set phonemes corresponding to the speech data as a result value to train the acoustic model. Hereinafter, the internal configuration of the acoustic model will be described.

The acoustic model according to the present disclosure may include the shared network.

The shared network according to the present disclosure may include a first AI model for outputting hidden representation by applying common acoustic information of a plurality of speech data used when the acoustic model is trained. The shared network may transfer the hidden representation to a layer of the branch network.

In this case, the shared network may include an artificial intelligence model obtained by combining various artificial neural networks such as a Convolutional Neural Network (CNN), Time Delay Neural Network (TDNN) for training Time sequence of limited data. For example, the shared network may include one artificial neural network obtained by combining the CNN model and the TDNN model. The internal configuration of the shared network is not limited to the above example.

The acoustic model according to the present disclosure may include a branch network.

The branch network according to the present disclosure may be connected to the shared network.

The branch network according to the present disclosure may classify phonemes of a language of the input speech data.

The branch network may include a second AI model for outputting the speech data based on the hidden representation transferred by the layer of the shared network.

In this case, the branch network may include an AI model obtained by combining various artificial neural networks such as recurrent Neural Network (RNN) using sequence data, and Time Delay Neural Network (TDNN) for training Long-Short Term Memory (LSTM) as a model obtained by introducing gate concept to the RNN to appropriately represent the temporal feature and Time sequence with limited data.

For example, the branch network may include one artificial neural network by combining the LSTM model and the TDNN. The internal configuration of the branch network is not limited to the above example.

The acoustic model according to the present disclosure may include a shared network and a branch network connected to the shared network. The acoustic model according to the present disclosure may include a plurality of branch networks. The plurality of branch networks may include a native branch network for outputting phonemes of a native language when obtaining speech data and a foreign branch network for outputting phonemes of a foreign language when obtaining speech data.

In the present disclosure, for convenience of description, speech data uttered by an American speaker is defined as a native speech data, and British English, and speech data uttered by other English speakers or foreign speakers. However, the above description is merely an example for convenience of description and a reference of the native speaker may be changed.

The processor 180 of the AI apparatus 100 may set feature data corresponding to input speech data as an input value of the acoustic model (S630). In this case, the acoustic model may include a branch network connected to a shared network, and the input value of the acoustic model may be interchangeably used with an input value of the shared network.

The processor 180 of the AI apparatus 100 may set phonemes corresponding to input speech data as an answer value of the acoustic model (S650).

In detail, the processor 180 may train the acoustic model using speech data and phonemes corresponding to the speech data. In a training process, the shared network and the branch network connected to the shared network that are included in the acoustic model may be trained to minimize an error between the answer value and a result value derived from a weight for fully connecting layers (S630 and S640).

The training method according to the present disclosure may include supervised learning for setting phonemes corresponding to speech data as an answer value, unsupervised learning for grouping similar data without setting of an answer value, or reinforcement learning for setting reward and learning.

Hereinafter, an example of learning will be described with reference to FIG. 7.

Figure 7:
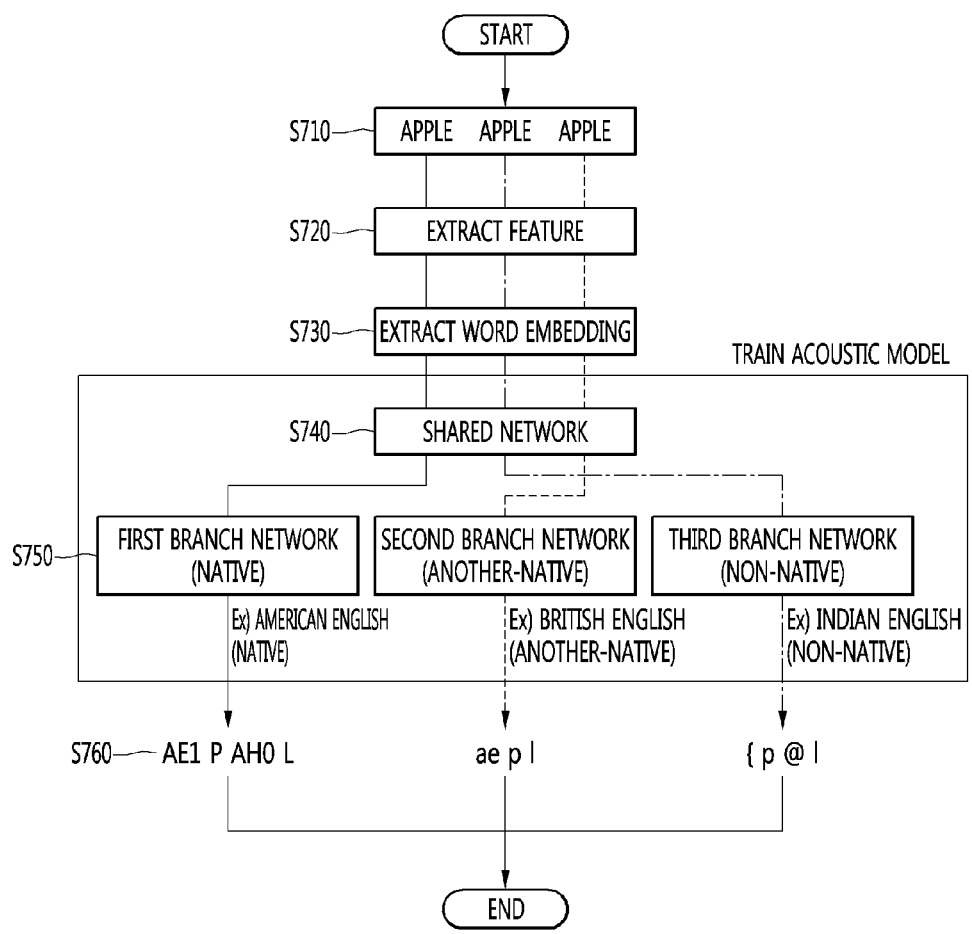
FIG. 7 illustrates an example of the present disclosure.

FIG. 7 illustrates an example of the present disclosure.

First, with reference to FIG. 7, a procedure in which an acoustic model trains speech data "APPLE" uttered by a native speaker and a foreign speaker is assumed.

The processor 180 of the AI apparatus 100 may obtain speech data corresponding to speech of a speaker (S710). The processor 180 may extract the feature of the obtained speech data and may extract a feature vector corresponding to speech data received through word embedding (S720 and S730).

For example, the processor 180 of the AI apparatus 100 may receive speech data "APPLE" uttered by the speaker. In this case, a feature extraction result of the "APPLE" may be changed according to features such as a position of a tongue, a shape of a mouth, intensity of sound, or a frequency when the speaker pronounces. Speech feature obtained may be differently generated according to the nationality of the speaker or whether the speaker is a native/foreign speaker.

In the specification, the speech feature may be interchangeably used with the terms corresponding to the received speech data such as the speech data, or the feature data.

The processor 180 of the AI apparatus 100 may train the acoustic model including the shared network and the branch network connected to the shared network using the obtained speech data and phonemes corresponding to the speech data.

In this case, speech data or feature data corresponding to the speech data may be set as an input value of the acoustic model, and the phonemes corresponding to the speech data may be set using a result value and the acoustic model may be trained.

The speech data obtained by the input interface 120 according to the present disclosure may include native speech data or foreign speech data.

According to an embodiment of the present disclosure, when obtaining the native speech data, the processor 180 may train the shared network and the native branch network connected to the shared network. In detail, when the speech data is uttered by a native speaker, the processor 180 may train the shared network and the native branch network connected to the shared network using the native speech data and phonemes of a native language corresponding to the native speech data.

For example, the processor 180 may use speech data corresponding to "APPLE" as a speech signal uttered by an American as an input value of a first acoustic model including the shared network and the native branch network connected to the shared network.

The processor 180 may set phonemes (e.g., CMU pronunciation sequence) "AE1 P AH0 L" of American English corresponding to the input "APPLE" as a result value of the first acoustic model.

The processor 180 may train the first acoustic model to minimize a value of an error L1 between an output value of the first acoustic model and "AE1 P AH0 L" as an answer value.

According to another embodiment, when obtaining the foreign speech data, the processor 180 may train the shared network and the foreign branch network connected to the shared network. In detail, when the speech data is uttered by a foreign speaker, the processor 180 may train the shared network and the foreign branch network connected to the shared network using foreign speech data and phonemes of a foreign language corresponding to the foreign speech data.

For example, the processor 180 may use speech data corresponding to "APPLE" as a speech signal uttered by the British as an input value of a second acoustic model including the shared network and the foreign branch network connected to the shared network.

The processor 180 may set phonemes (e.g., BEEP pronunciation sequence) "æ p l" of British English corresponding to the input "APPLE" as a result value of the second acoustic model.

The processor 180 may train the second acoustic model to minimize a value of an error L2 between an output value of the second acoustic model and an answer value "æ p l".

In another example, the processor 180 may use speech data corresponding to "APPLE" as a speech signal uttered by an Indian as an input value of a third acoustic model including the shared network and a foreign branch network connected to the shared network.

The processor 180 may set phonemes (e.g., X-SAMPA pronunciation sequence) "{ p @ l" of Indian English corresponding to the input "APPLE" as a result value of the second acoustic model.

The processor 180 may train the third acoustic model to minimize a value of an error L3 between an output value of the third acoustic model and an answer value "{ p @ l".

According to the present disclosure, the shared network may be used during training irrespective of whether a speaker is a native/foreign speaker. Thus, when training the shared network, the processor 180 may be trained to represent command feature of the received speech data to the shared network irrespective of whether the speaker is a native/foreign speaker.

During the procedure, the shared network may be trained irrespective of whether the speaker is a native/foreign speaker, and thus, when obtaining native speech data/foreign speech data by the acoustic model in the future, the shared network may extract the common speech feature.

In other words, the shared network may transfer the common feature of the native/foreign speech data to the hidden representation to prevent overfitting of a language of a specific country of an updated acoustic model. In addition, a regularization effect of the acoustic model that is not inclined to speech feature of a specific person of a native/foreign speaker may be obtained during a training procedure.

According to the present disclosure, a branch network connected to a shared network may be differently set according to a native/foreign speaker during training, and thus the branch network may be trained to perform a function of classifying phonemes appropriate for each language.

In detail, the number of phonemes may be different for each language. For example, the number of CMU phonemes corresponding to American English may be 39, and the number of BEEP phonemes corresponding to British English may be 50.

That is, in the case of native/foreign speech data, the number of phonemes corresponding to the respective native/foreign speech data is different, and thus results that are finally output by the acoustic model may be different. Thus, the branch network may be separately required for each language.

The AI apparatus 100 according to the present disclosure may separately use a branch network for each language, and thus phonemes of non-native speech data and phonemes of native speech data may be integrated into one set and may be used for training, or a rule for mapping phoneme according to one to one correspondence may be determined and the acoustic model may be trained without effort for collecting data whenever a non-native country is added.

Hereinafter, a procedure of classifying speech data obtained by the processor 180 of the AI apparatus 100 for each country when obtaining a plurality of speech data, changing the branch network connected to the shared network based on the classified speech data, and training the acoustic model will be described. Overlapping descriptions for those are omitted.

According to the present disclosure, an input interface of the AI apparatus 100 may obtain a plurality of speech data (S710). The processor 180 may extract features of the plurality of input speech data (S720 and S730).

The processor 180 may determine whether the input speech data is uttered by a native speaker or a foreign speaker. In detail, the processor 180 may separate the nationality of a speaker using a relationship between embedding information on speech and a database for storing linguistic feature of speech of the native/foreign speaker and may determine whether the input speech data is native or foreign speech data.

When determining that the speech data is native speech data, the processor 180 of the AI apparatus 100 may obtain phonemes of a native language stored in the memory 170. When determining that the speech data is foreign speech data, the processor 180 may obtain phonemes of a foreign language stored in the memory 170.

When obtaining the native speech data, the processor 180 according to the present disclosure may train the shared network and a native branch network connected to the shared network, and when obtaining the foreign speech data, the processor 180 may train the shared network and a foreign branch network connected to the shared network.

In detail, when obtaining the native speech data, the processor 180 may connect the shared network in the acoustic model to the native branch network to establish the first acoustic model. The processor 180 may input native speech data as an input value of the first acoustic model, and may set phonemes of a native language corresponding to the native speech data as a result value to train the first acoustic model.

When obtaining the foreign speech data, the processor 180 may connect the shared network inside the acoustic model to the foreign branch network and may establish the second acoustic model. The processor 180 may input foreign speech data as an input value of the second acoustic model and may set phonemes of a foreign language corresponding to the foreign speech data using the result value to train the second acoustic model.

The processor 180 according to the present disclosure may design a cost function to minimize the sum of an error L1 between an answer value and an output value of the first acoustic model and an error L2 between an answer value and an output value of the second acoustic model and may train the acoustic model to minimize the error.

Figure 8:
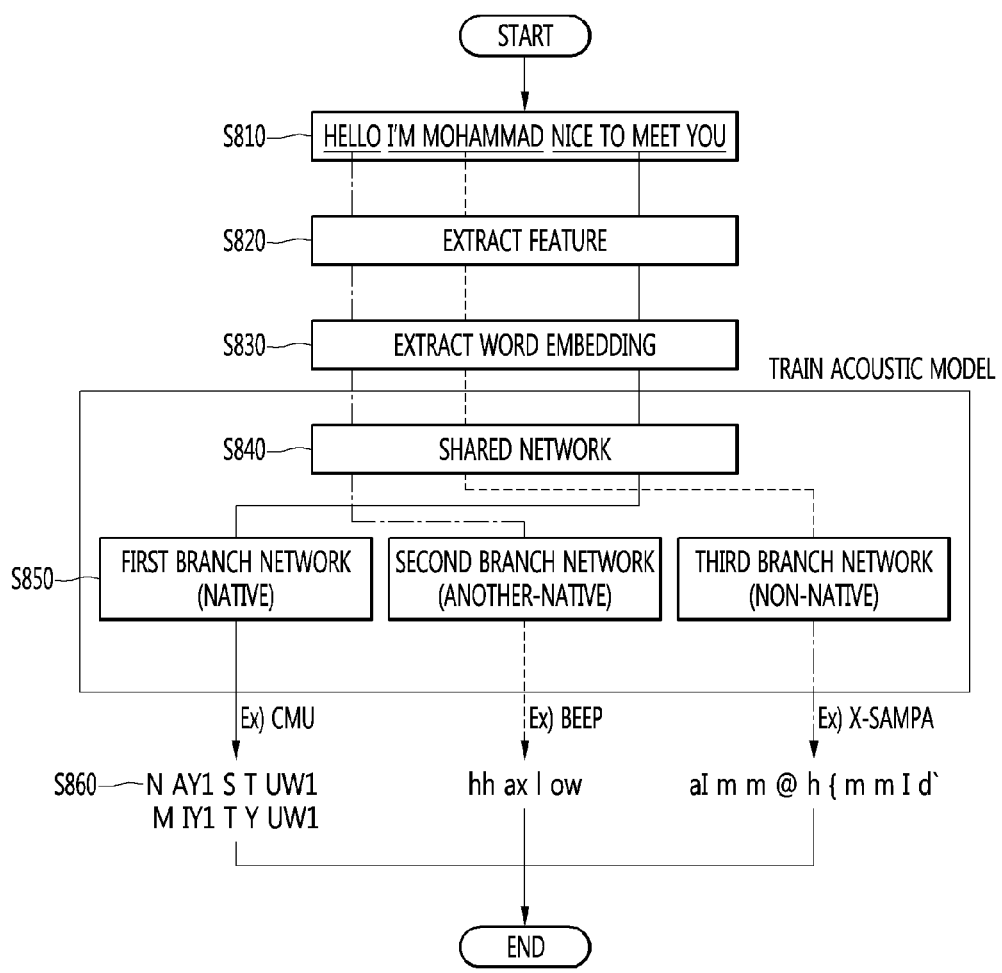
FIG. 8 illustrates an example of the present disclosure.

FIG. 8 illustrates an example of the present disclosure.

FIG. 8 illustrates an example of training an acoustic model in a conversation in which languages of a plurality of countries are mixed in speech.

The processor 180 according to the present disclosure may obtain speech data configured with a conversation including languages of a plurality of countries (S810). The processor 180 may extract feature data of the obtained speech data (S820 and S830). The processor 180 may segment languages of different countries included in the conversation using speech feature of the speech data.

The processor 180 according to the present disclosure may train the acoustic model using phonemes corresponding to the plurality of segmented speech data.

The processor 180 may change the branch network connected to the shared network according to a country corresponding to the plurality of segmented speech data and may train the acoustic model for each country using the changed acoustic model.

The processor 180 may set a cost function of the acoustic model to minimize the sum of errors between each of phonemes output from the acoustic model and an answer value corresponding to each of the phonemes as the plurality of segmented speech data is input to the acoustic model. The performance of the acoustic model may be enhanced irrespective of the native/foreign speaker through the above procedure.

As the plurality of segmented speech data are input to the acoustic model, the processor 180 may apply a weight to errors between each of phonemes output from the acoustic model and an answer value corresponding to each of the phonemes and may set a cost function of the acoustic mode to minimize the sum of errors to which the weight is applied. Through the above procedure, the performance of the acoustic model of a language on which a user wants to concentrate.

For example, the processor 180 may be assumed to obtain speech data configured with a conversation including languages of a plurality of countries, such as "(Englishman speech) Hello", "(Indian speech) I'm mohhamad", and "(American speech) Nice to meet you".

The processor 180 may segment the speech data into "Hello", "I'M MOHHAMAD", and "Nice to meet you".

The processor 180 may obtain phonemes corresponding to each of the segmented speech data. In detail, the processor 180 may obtain phonemes (e.g., BEEP) "hh ax l ow" of British English corresponding to "hello". In addition, the processor 180 may obtain phonemes (e.g., X-SAMPA) "aI m m @ h { mm I d" of Indian English corresponding to "I'm mohhamad" and phonemes (e.g., CMU) "N AY1 S T UW1 M IY1 T Y UW1" of American English corresponding to "nice to meet you".

The processor 180 according to the present disclosure may train the acoustic model using phonemes corresponding to the plurality of segmented speech data.

In detail, the processor 180 may change the branch network connected to the shared network according to a country of each of the plurality of segmented speech data. The acoustic model corresponding to each language may be trained using the changed acoustic model.

The processor 180 according to the present disclosure may apply a weight to loss L1 of American speech data "nice to meet you" loss L2 of British speech data "hello", and loss L3 of Indian speech data "I'm mohammad" from input of the cost function of the acoustic model and may train the acoustic model to minimize total cost obtained by summing the weights.

Figure 9:
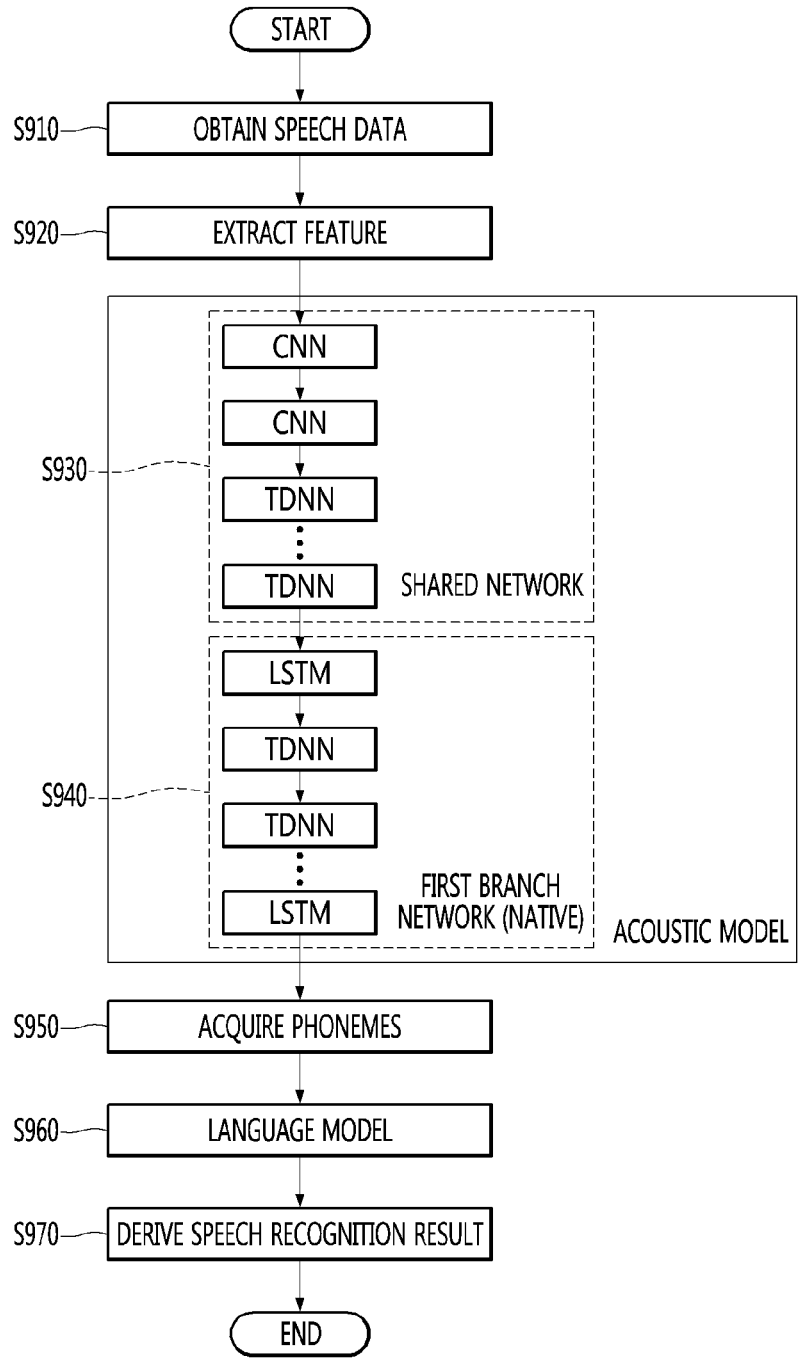
FIG. 9 illustrates an example of the present disclosure.

FIG. 9 illustrates an example of the present disclosure.

FIG. 9 is a diagram for explaining use of an acoustic model that is completely trained.

The processor 180 of the AI apparatus 100 may obtain speech data and may extract feature of the speech data (S910 and S920).

The processor 180 according to the present disclosure may input the speech data to an updated acoustic model including the shared network and the native branch network that are updated according to learning, and may perform speech recognition using phonemes of a native language updated from the updated acoustic model.

In detail, in order to perform speech recognition, the processor 180 according to the present disclosure may be configured to connect the acoustic model to the shared network and the native branch network. The processor 180 may input the obtained speech data to the shared network included in the acoustic model updated according to training (S930).

The shared network according to the present disclosure may output hidden representation to which acoustic information of the input speech data is applied and may transfer the hidden representation to a layer of the native branch network (S940).

The native branch network according to the present disclosure may output phonemes of a native language to which feature of the input speech data is applied based on the hidden representation transferred by the layer of the shared network (S950).

According to the present disclosure, the branch network connected to the shared network may be differently used for respective languages during training, but the native branch network may be connected to the shared network and the updated acoustic model may be used irrespective of the input language while being used.

Thus, a result output from the acoustic model updated while the acoustic model is used may be phonemes of a native language, and a speech recognition result corresponding to phonemes of a native language may be derived irrespective of a language when the speech recognition model is decoded (S970).

According to another embodiment of the present disclosure, the input interface 120 of the AI apparatus 100 may obtain user input for selecting a native speaker or a foreign speaker.

The processor 180 may select the updated acoustic model to connect the shared network to the branch network corresponding to user selection based on the user selection.

The processor 180 may input the speech data to the changed acoustic model and may perform speech recognition using phonemes output from the changed acoustic model.

For example, an Englishman (for convenience in the specification, referred to as a foreign speaker) may change the native branch network included in the acoustic model to a British language branch network using the input interface 120 of the AI apparatus 100. The British language branch network may be connected to the shared network to establish the acoustic model.

In this case, when obtaining speech data corresponding to user speech, the processor 180 of the AI apparatus 100 may input speech data to the acoustic model. The acoustic model may output phonemes (e.g., BEPP) corresponding to British English.

Through the above procedure, the AI apparatus 100 may derive a speech recognition result using phonemes familiar to the user when speech recognition is performed.

According to the present disclosure, an acoustic model may be trained using a shared network and a branch network that output hidden representation to which common acoustic information of speech data of a native language and speech data of a foreign language is applied, and phonemes of a native language may be obtained using the trained acoustic model, thereby enhancing performance for speech data of a foreign language while maintaining performance for speech data of a native language Flowcharts according to the present disclosure may be performed regardless of the order or concurrently. That is, they are not constrained in time-series order.

Other implementations are within the scope of the following claims

The present disclosure can be made in software, firmware or a combination of software and firmware.

The present disclosure may include one or more processors. The one or more processors may include 'the processor 180' or 'a processor for operating an artificial intelligence model'.

According to an embodiment of the present disclosure, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

What is claimed is:

1. An artificial intelligence (AI) apparatus for speech recognition, comprising:
an input interface configured to: obtain speech data corresponding to user speech, receive second speech data, and receive user input for selecting a native speaker or a foreign speaker; and
a processor configured to:
train an acoustic model including a shared network and a branch network connected to the shared network using the speech data and phonemes corresponding to the speech data, wherein the branch network includes a native branch network and a foreign branch network,
change an updated acoustic model to connect the shared network to the native branch network or the foreign branch network corresponding to the received user input for selecting the native speaker or the foreign speaker,
input the received second speech data to the changed updated acoustic model, and
perform speech recognition using phonemes output by the changed updated acoustic model.

2. The AI apparatus of claim 1, wherein the shared network includes a first AI model configured to apply common acoustic information of a plurality of speech data used during training to output hidden representation and configured to transfer the hidden representation to a layer of the branch network.

3. The AI apparatus of claim 2, wherein the plurality of speech data includes native speech data or foreign speech data; and
wherein, when obtaining the native speech data, the processor is further configured to train the shared network and a native branch network connected to the shared network, and when obtaining the foreign speech data, the processor is further configured to train the shared network and a foreign branch network connected to the shared network.

4. The AI apparatus of claim 2, wherein the branch network includes a second AI model configured to output the phonemes corresponding to the speech data based on the hidden representation transferred by a layer of the shared network.

5. The AI apparatus of claim 1, wherein, when the speech data is speech data uttered by a native speaker, the processor is further configured to train the shared network and a native branch network connected to the shared network using native speech data and phonemes of a native language corresponding to native speech data.

6. The AI apparatus of claim 1, wherein, when the speech data is uttered by a foreign speaker, the processor is further configured to train the shared network and a foreign branch network connected to the shared network using foreign speech data and phonemes of a foreign language corresponding to the foreign speech data.

7. The AI apparatus of claim 1, wherein the second speech data includes foreign speech data; and
wherein the processor is further configured to: input the second speech data to the updated acoustic model and perform speech recognition using the phonemes of native language output by the updated acoustic model.

8. An operation method of an artificial intelligence (AI) apparatus for speech recognition, the method comprising:
obtaining speech data corresponding to user speech, second speech data, and user input for selecting a native speaker or a foreign speaker;
training an acoustic model that includes a shared network and a branch network connected to the shared network using the speech data and phonemes corresponding to the speech data, wherein the branch network includes a native branch network and a foreign branch network;
changing an updated acoustic model to connect the shared network to the native branch network or the foreign branch network corresponding to the obtained user input for selecting the native speaker or the foreign speaker;
input the second speech data to the changed updated acoustic model; and
perform speech recognition using phonemes output by the changed updated acoustic model.

9. The method of claim 8, wherein the training the acoustic model includes applying common acoustic information of a plurality of speech data used when the shared network is trained to output hidden representation and transferring the hidden representation to a layer of the branch network.

10. The method of claim 9, wherein the plurality of speech data includes native speech data or foreign speech data; and
wherein the training the acoustic model includes:
when obtaining the native speech data, training the shared network and a native branch network connected to the shared network; and
when obtaining the foreign speech data, training the shared network and a native branch network connected to the shared network.

11. The method of claim 9, wherein the training the acoustic model includes outputting the phonemes corresponding to the speech data based on the hidden representation transferred by the layer of the branch network.

12. The method of claim 8, wherein the training the acoustic model includes, when the speech data is speech data uttered by a native speaker, training the shared network and a native branch network connected to the shared network using native speech data and phonemes of a native language corresponding to native speech data.

13. The method of claim 8, wherein the training the acoustic model includes, when the speech data is uttered by a foreign speaker, training the shared network and a foreign branch network connected to the shared network using foreign speech data and phonemes of a foreign language corresponding to the foreign speech data.

14. The method of claim 8, wherein, the performing the speech recognition includes, when the second speech data includes foreign speech data, performing speech recognition using the phonemes of a native language output by the updated acoustic model.

* * * * *